US010486595B2

(12) United States Patent
Ajisaka (10) Patent No.: US 10,486,595 B2
(45) Date of Patent: Nov. 26, 2019

(54) VEHICLE REAR VIEWING DEVICE WITH A HOUSING, AN IMAGING DEVICE, AND A DISPLAY SCREEN

(71) Applicant: TOYOTA JIDOSHA KABUSHIKI KAISHA, Toyota-shi, Aichi-ken (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/992,637

(22) Filed: May 30, 2018

(65) Prior Publication Data

US 2018/0361931 A1 Dec. 20, 2018

(30) Foreign Application Priority Data

Jun. 15, 2017 (JP) .................................. 2017-118026

(51) Int. Cl.
| | |
|---|---|
| *B60R 1/00* | (2006.01) |
| *B60R 11/04* | (2006.01) |
| *B60R 11/00* | (2006.01) |
| *B60R 11/02* | (2006.01) |
| *H04N 5/225* | (2006.01) |

(52) U.S. Cl.
CPC ............ *B60R 1/00* (2013.01); *B60R 11/0229* (2013.01); *B60R 11/04* (2013.01); *H04N 5/2253* (2013.01); *B60R 2011/004* (2013.01); *B60R 2011/0021* (2013.01)

(58) Field of Classification Search
CPC ............ B60R 1/006; B60R 2001/1253; B60R 2001/1215; B60R 11/0229; B60R 11/04; B60R 1/001; B60J 5/04
See application file for complete search history.

(56) References Cited

U.S. PATENT DOCUMENTS

| | | | | |
|---|---|---|---|---|
| 4,984,842 A | * | 1/1991 | Ogawa ........................ | B60J 5/06 296/155 |
| 5,378,036 A | * | 1/1995 | Townsend ................... | B60J 5/06 296/155 |
| 2008/0309764 A1 | * | 12/2008 | Kubota ....................... | B60R 1/00 348/148 |

(Continued)

FOREIGN PATENT DOCUMENTS

| | | |
|---|---|---|
| JP | 2014-193630 A | 10/2014 |
| JP | 2014-193631 A | 10/2014 |
| JP | 2016-032978 A | 3/2016 |

*Primary Examiner* — Jamie J Atala
*Assistant Examiner* — Michael Robert Cammarata
(74) *Attorney, Agent, or Firm* — Oliff PLC (57) ABSTRACT

A vehicle rear viewing device includes an imaging device at a side portion of a vehicle configured to capture images toward a vehicle rear side. The device may also include a display device that has a display screen that displays images captured by the imaging device and a housing disposed at a vehicle front side of a side door glass of a sliding-type door and at a vehicle lower side of a front pillar. The housing may include an outer side portion that has a door handle mounted thereto and that structures a case of the imaging device and that includes an outer side through portion that exposes a lens portion of the imaging device. The housing may also include an inner side portion that structures a case of the display device and includes an inner side through portion that exposes the display screen toward a vehicle inner side.

3 Claims, 5 Drawing Sheets

(56) References Cited

U.S. PATENT DOCUMENTS

| | | | |
|---|---|---|---|
| 2012/0314075 A1* | 12/2012 | Cho | B60R 1/00 348/148 |
| 2014/0285666 A1* | 9/2014 | O'Connell | B60R 1/00 348/148 |
| 2015/0165975 A1* | 6/2015 | Meadows | B60R 1/006 701/49 |
| 2017/0161949 A1* | 6/2017 | Seder | G06F 3/011 |
| 2017/0182943 A1* | 6/2017 | Hoenninger | B60R 1/00 |
| 2017/0223274 A1* | 8/2017 | Wirth | B60R 11/0235 |
| 2017/0349098 A1* | 12/2017 | Uhm | B60K 35/00 |
| 2018/0118130 A1* | 5/2018 | Karabed | B60R 1/00 |
| 2019/0031102 A1* | 1/2019 | Kishimoto | B60R 1/00 |

\* cited by examiner

FIG.5

VEHICLE REAR VIEWING DEVICE WITH A HOUSING, AN IMAGING DEVICE, AND A DISPLAY SCREEN

CROSS-REFERENCE TO RELATED APPLICATION

This application is based on and claims priority under 35 USC 119 from Japanese Patent Application No. 2017-118026 filed on Jun. 15, 2017, the disclosure of which is incorporated by reference herein.

BACKGROUND

Technical Field

The present disclosure relates to a vehicle rear viewing device.

Related Art

A technique relating to a vehicle body periphery imaging device is disclosed in Japanese Patent Application Laid-Open (JP-A) No. 2016-032978. This vehicle body periphery imaging device has a camera, a reflecting mirror and a monitor. The camera directly images the region at the rear of the vehicle within the range of the direct imaging angle, and indirectly images the region at the side of the vehicle within the range of the reflection imaging angle of the reflecting mirror. A direct image that is directly captured by the camera and an indirect image that is captured by the camera via the reflecting mirror are made into a seamless image by image processing and displayed on the monitor. By viewing this image, the driver may confirm the situation at the rear of the vehicle. Moreover, in this related art, a housing that is molded integrally with a triangular window is disposed at the side surface of the vehicle body. The camera, the reflecting mirror and the monitor are contained inside this housing, and therefore, the device may be made to be compact on the whole.

However, in this technique, the camera and the monitor are separately mounted to the inner side of the housing, and there is room for improvement with regard to the point of reducing the number of assembly processes of the device on the whole.

SUMMARY

In view of the above-described circumstances, the present disclosure provides a vehicle rear viewing device that may reduce the number of assembly processes of the device on the whole.

One aspect of the present disclosure is a vehicle rear viewing device that includes: an imaging device that is disposed at a side portion of a vehicle and is configured to capture images of a vehicle rear side; a display device including a display screen that is configured to display the images captured by the imaging device; and a housing that, in a state in which a vehicle upper side portion of a side door opening of a vehicle body that is opened and closed by a side door is closed by a side door glass, is configured to be disposed at a vehicle front side of the side door glass and at a vehicle lower side of a front pillar that structures a portion of the vehicle body, the housing including an outer side portion that structures a side surface at a vehicle transverse direction outer side, and an inner side portion that structures a side surface at a vehicle transverse direction inner side, wherein the outer side portion structures a portion of a case of the imaging device, and includes an outer side through portion, through which a lens portion of the imaging device is exposed, and the inner side portion structures a portion of a case of the display device, and includes an inner side through portion, through which the display screen is exposed in a state of facing a vehicle transverse direction inner side.

In accordance with the aspect, the imaging device that is able to capture images of the vehicle rear side is disposed at a side portion of the vehicle. The images captured by the imaging device are displayed on the display screen, which faces the vehicle transverse direction inner side, of the display device. Therefore, the driver may confirm the situation at the rear of the vehicle by viewing the image displayed on the display screen of the display device, instead of a door mirror.

In making compact an entire device that is used in confirming the rear of the vehicle, it has been thought to dispose a housing at the vehicle body or at the side door, and to contain the imaging device and the display device at the inner side of this housing. However, when the imaging device and the display device are mounted separately to the inner side of the housing, the number of assembly processes of the device on the whole, which is structured to includes these parts, increases.

Here, in the above aspect, in the state in which the vehicle upper side portion of the side door opening of the vehicle body, which is opened and closed by the side door, is closed by the side door glass, the housing is disposed at the vehicle front side of the side door glass and at the vehicle lower side of the front pillar that structures a portion of the vehicle body. Further, the cases of the imaging device and the display device are structured by this housing.

Namely, the housing includes the outer side portion that structures the side surface at the vehicle transverse direction outer side, and the inner side portion that structures the side surface at the vehicle transverse direction inner side. The outer side portion structures a portion of the case of the imaging device, and the outer side through portion, through which the lens portion of the imaging device is exposed, is formed in the outer side portion. Therefore, in the above aspect, the outer side portion of the housing and the imaging device are able to be structured integrally.

The inner side portion structures a portion of the case of the display device, and the inner side through portion, through which the display screen of the display device is exposed in a state of facing the vehicle transverse direction inner side, is formed in the inner side portion. Therefore, in the above aspect, the inner side portion of the housing and the display device are able to be structured integrally.

As a result, in this aspect, the imaging device, the display device and the housing are made integral, and are made into a module having an imaging function and an image display function. By mounting this module to the vehicle, the mounting of the imaging device and the display device to the vehicle is completed. Moreover, because the position at which the housing is disposed is set as described above, the driver may view the display screen of the display device with a feeling that is similar to that at the time of viewing a door mirror at a vehicle to which a door mirror is mounted.

In this way, in the vehicle rear viewing device relating to the aspect, the number of assembly processes of the device on the whole may be reduced.

In the above-described aspect, the housing may have a substantially triangle shape whose width widens toward a vehicle rear side as seen from a thickness direction of the side door that is in a state of closing the side door opening, the inner side through portion may have a substantially triangle shape whose peripheral edge portion runs along a peripheral edge portion of the inner side portion, and the display screen may have a substantially triangle shape whose peripheral edge portion runs along the peripheral edge portion of the inner side through portion.

In accordance with the above structure, the housing is formed in the shape of a triangle whose width widens toward the vehicle rear side, as seen from the thickness direction of the side door that is in a state of closing the side door opening. Note that what is called "triangular" here and what is called "triangular" hereinafter encompasses not only exact triangular shapes, but also shapes that are substantially triangular. Therefore, in a vehicle whose specifications are such that the vehicle has a triangular window, the housing may be disposed in place of the glass portion of this triangular window. Further, the inner side through portion is formed in the shape of a triangle whose peripheral edge portion runs along the peripheral edge portion of the inner side portion, and the display screen is formed in the shape of a triangle whose peripheral edge portion runs along the peripheral edge portion of the inner side through portion. Therefore, the display screen may be made to be large as compared with a case in which the display screen is made to be a rectangular shape that is contained at the inner side portion as seen from the vehicle inner side, or the like.

In this way, in the vehicle rear viewing device of the above structure, universal usage in vehicles, whose specifications are such that the vehicle has a triangular window, is ensured, and it is easy for the driver to view the display screen of the display device.

In the above-described aspect, the side door may be a sliding-type door, the housing may be mounted to the side door, and a door handle for opening and closing the side door may be mounted to the outer side portion.

In accordance with the above structure, at a vehicle that is equipped with a sliding-type side door, the housing is mounted to the side door. The door handle that is operated in order to open and close the side door is mounted to the outer side portion of the housing. Therefore, in this structure, the imaging device, the display device, the door handle and the housing are made integral, and these parts may be mounted to the vehicle as a single module.

The vehicle rear viewing device of the above structure may contribute to a decrease in the number of assembly processes of a vehicle that is equipped with a sliding-type side door.

In the above-described aspect, the outer side portion may include an outer concave portion that is recessed toward the inner side portion, and the door handle may be accommodated inside the outer concave portion.

In accordance with the above structure, the outer concave portion, which is recessed toward the inner side portion of the housing, is formed at the outer side portion of the housing. The door handle is contained inside this outer concave portion. Therefore, the door handle appearing in the images that are captured by the imaging device may be prevented.

In the vehicle rear viewing device of the above structure, it is easier for the driver to confirm the situation at the rear of the vehicle at a vehicle that has a sliding-type side door.

BRIEF DESCRIPTION OF THE DRAWINGS

An exemplary embodiment of the present disclosure will be described in detail based on the following figures, wherein.

DETAILED DESCRIPTION

First Embodiment

A first embodiment of a vehicle rear viewing device relating to the disclosure is described hereinafter by using FIG. 1 through FIG. 4. Note that arrow FR that is shown in the respective drawings indicates the vehicle front side, arrow UP indicates the vehicle upper side, and arrow OUT indicates a vehicle transverse direction outer side.

Figure 1:
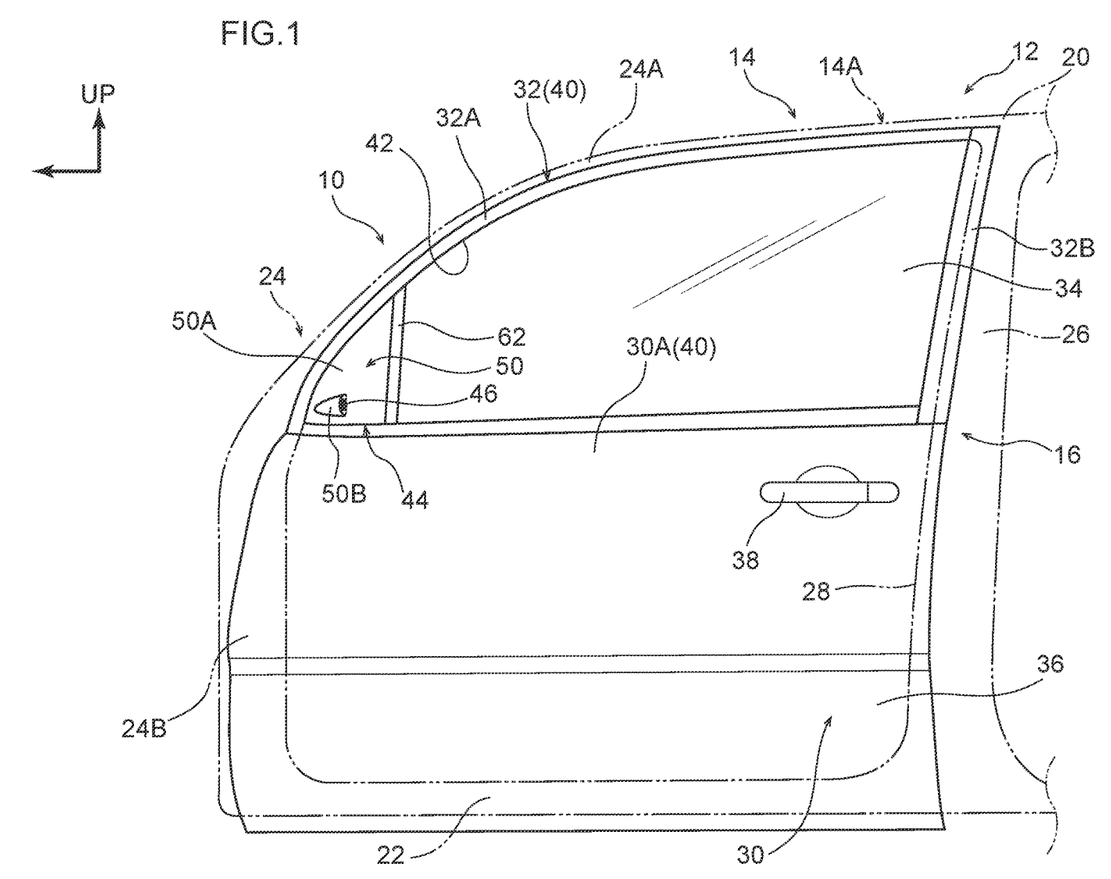
FIG. 1 is a side view that is seen from a vehicle transverse direction outer side and shows the structure of a vehicle that has a vehicle rear viewing device relating to a first embodiment.
Figure 4:
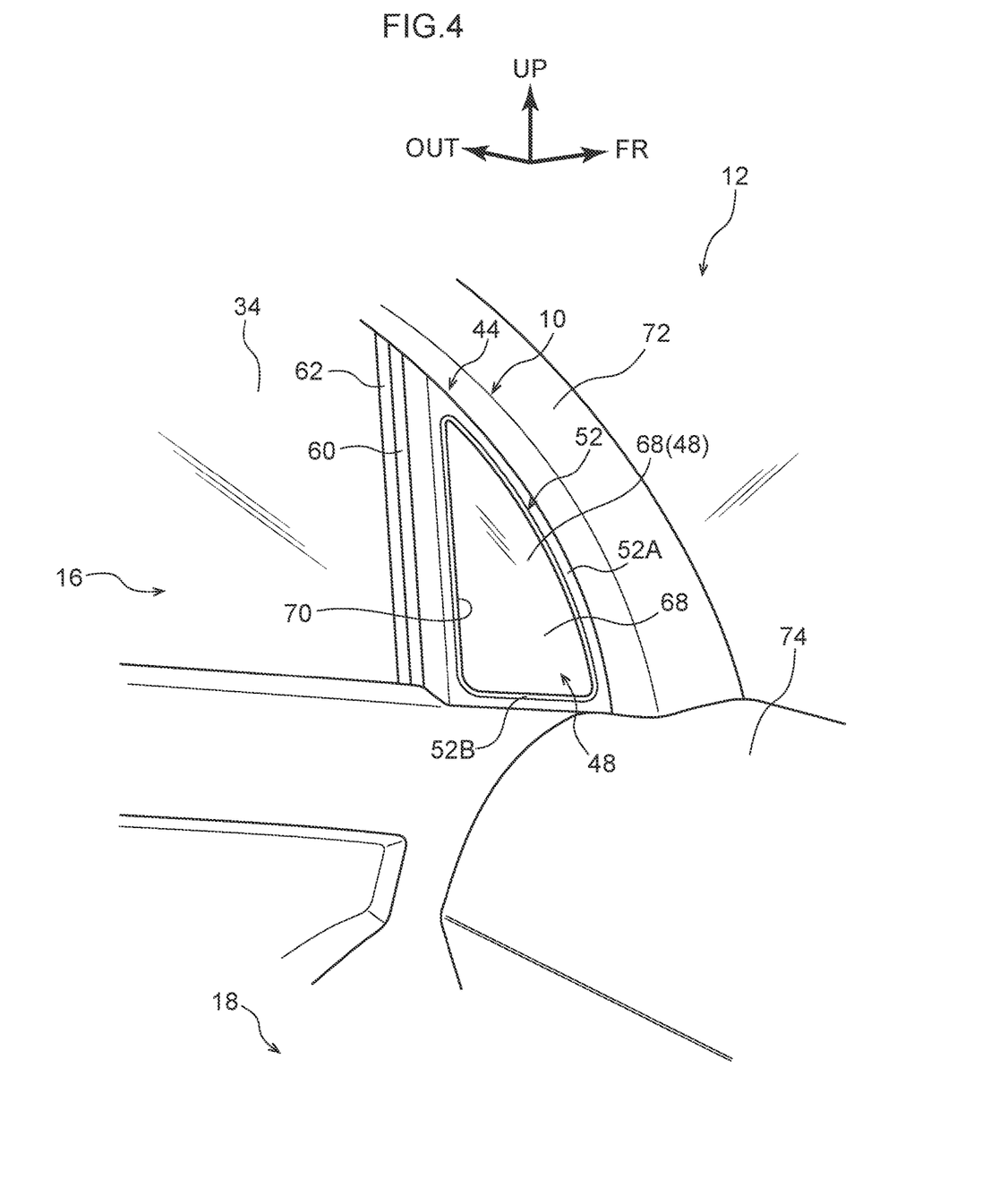
FIG. 4 is a perspective view that shows the structure of the cabin interior of the vehicle that has the vehicle rear viewing device relating to the first embodiment, and in which a peripheral portion of the vehicle rear viewing device is seen from a driver who is seated in a driver's seat.

First, the schematic structure of a vehicle 12, to which a vehicle rear viewing device 10 relating to the first embodiment is mounted, is described by using FIG. 1 and FIG. 4. The vehicle 12 includes a vehicle body 14, and side doors (front doors) 16 that are mounted to the vehicle body 14. In the first embodiment, an unillustrated driver's seat in which the driver sits is disposed at the portion that is at the vehicle front side and the vehicle transverse direction right side of a cabin 18, and the vehicle 12 is a right-hand drive vehicle. Further, in the first embodiment, because the vehicle 12 is structured basically symmetrically to the left and the right, in the following description, the structures at the vehicle transverse direction left side of the vehicle 12 are mainly described, and description of the structures at the vehicle transverse direction right side are omitted.

The vehicle 14 includes a roof side rail 20 that structures a portion of the vehicle upper side of the vehicle body 14 and extends in the vehicle longitudinal direction, and a rocker 22 that structures a portion of the vehicle lower side of the vehicle body 14 and extends in the vehicle longitudinal direction.

Further, a front pillar 24 and a center pillar 26 that connect the roof side rail 20 and the rocker 22 are provided at a side portion 14A of the vehicle body 14. In detail, the front pillar 24 has a pillar upper 24A, which structures the vehicle upper side portion of the front pillar 24 and extends from the vehicle front and lower side toward the vehicle rear and upper side as seen from the vehicle transverse direction, and a pillar lower 24B that extends from the vehicle front side portion of the pillar upper 24A toward the vehicle lower side. The vehicle front side portion of the roof side rail 20 and the vehicle front side portion of the rocker 22 are connected in the vehicle vertical direction by the front pillar 24.

The center pillar 26 extends in the vehicle vertical direction, and connects the vehicle longitudinal direction central portion of the roof side rail 20 and the vehicle longitudinal direction central portion of the rocker 22. A side door opening 28, which is substantially rectangular as seen from the vehicle transverse direction and is partitioned by the roof side rail 20, the rocker 22, the front pillar 24 and the center pillar 26 and is opened and closed by the side door 16, is formed in the side portion 14A of the vehicle body 14.

In the state in which the side door opening 28 is closed (i.e., the side door 16 is closed), the width direction of the side door 16 (the door width direction) coincides with the vehicle longitudinal direction, and the thickness direction of the side door 16 (the door thickness direction) coincides with the vehicle transverse direction. Note that the door width direction and the door thickness direction that are used in the following description both mean directions in the state in which the side door 16 is closed.

The side door 16 includes a side door main body 30, a door frame 32 and a side door glass (door window glass) 34. The side door main body 30 structures the vehicle lower side portion of the side door 16, and, as seen from the vehicle transverse direction, extends in the vehicle vertical direction and the vehicle longitudinal direction, and is formed in a rectangular shape whose length direction is the vehicle longitudinal direction. Further, the side door main body 30 includes a door outer panel 36 that structures the vehicle transverse direction outer portion thereof, and an unillustrated door inner panel that structures the vehicle transverse direction inner portion thereof. An unillustrated insert-through portion, through which the side door glass 34 is inserted, is provided along the vehicle longitudinal direction at a peripheral edge portion 30A that is at the vehicle upper side of the side door main body 30. The side door 16 is pivotably supported at the front pillar 24 via unillustrated hinge portions that are provided at the vehicle front side of the side door main body 30. A gripping-type door handle 38 is provided at the vehicle rear side of the side door main body 30.

The door frame 32 includes a front frame portion 32A that structures the vehicle front portion thereof, and a rear frame portion 32B that structures the vehicle rear portion thereof. As seen from the vehicle transverse direction, the door frame 32 is formed in a substantial U-shape whose vehicle lower side is open. Further, the door frame 32, together with the peripheral edge portion 30A of the side door main body 30, structure a window frame 40.

In detail, the front frame portion 32A extends toward the vehicle rear and upper side from the vehicle front side end portion at the peripheral edge portion 30A of the side door main body 30. The vehicle front side portion of this front side frame portion 32A is curved so as to be convex toward the vehicle front and upper side. The vehicle rear side portion of the front side frame portion 32A extends rectilinearly in the vehicle longitudinal direction. The rear frame portion 32B extends in the vehicle vertical direction, and connects the vehicle rear end portion of the peripheral edge portion 30A of the side door main body 30 and the vehicle rear end portion of the front frame portion 32A.

The side door glass 34 is formed in a plate shape, and is configured capable of being raised and lowered in the vehicle vertical direction along the rear frame portion 32B by an unillustrated raising/lowering device. A window opening 42 that is partitioned by the window frame 40 is opened and closed by the lowering and raising of the side door glass 34. This window opening 42 may also be considered to be the vehicle upper side portion of the side door opening 28, and the side door glass 34 may also be considered as opening and closing the vehicle upper side portion of the side door opening 28. Further, in the state in which the side door glass 34 has been lowered toward the vehicle lower side with respect to the window frame 40, the side door glass 34 is housed between the door outer panel 36 and the door inner panel. Hereinafter, description is given with the side door glass 34 being in a state of closing the window opening 42, unless otherwise stated.

In the first embodiment, as seen from the vehicle transverse direction, the vehicle front side portion of the window opening 42 is closed by a housing 44 of the vehicle rear viewing device 10. Further, the present embodiment has the feature that a camera 46 that serves as the imaging device of the vehicle rear viewing device 10, and a monitor 48 that serves as the display device, are structured integrally with the housing 44. Hereinafter, the structure of the vehicle rear viewing device 10, which structures the main portion of the first embodiment, is described in detail.

Figure 2:
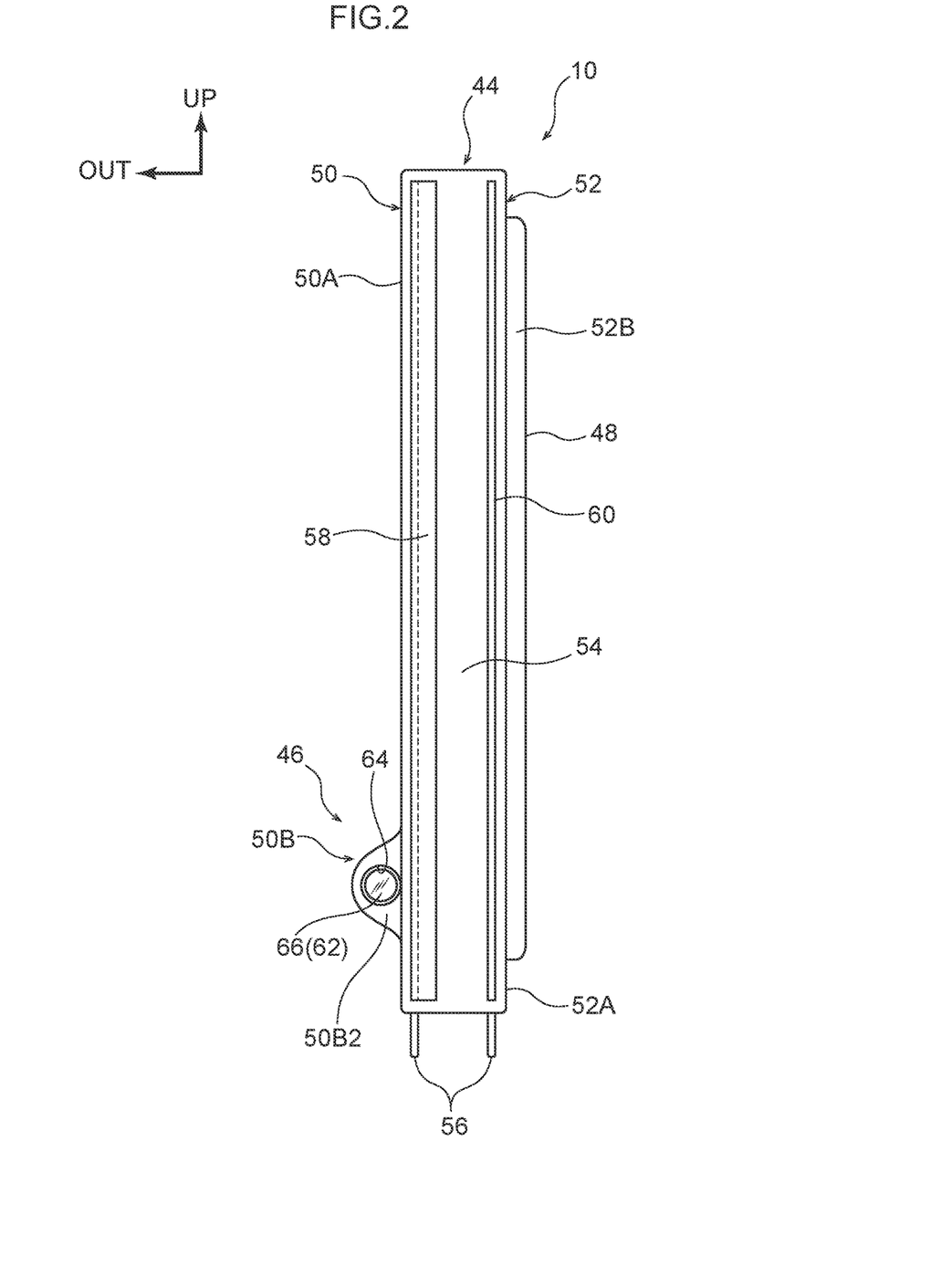
FIG. 2 is a rear view that shows the structure of the vehicle rear viewing device relating to the first embodiment, and in which the vehicle rear viewing device being mounted to the vehicle is seen from the vehicle rear side.
Figure 3:
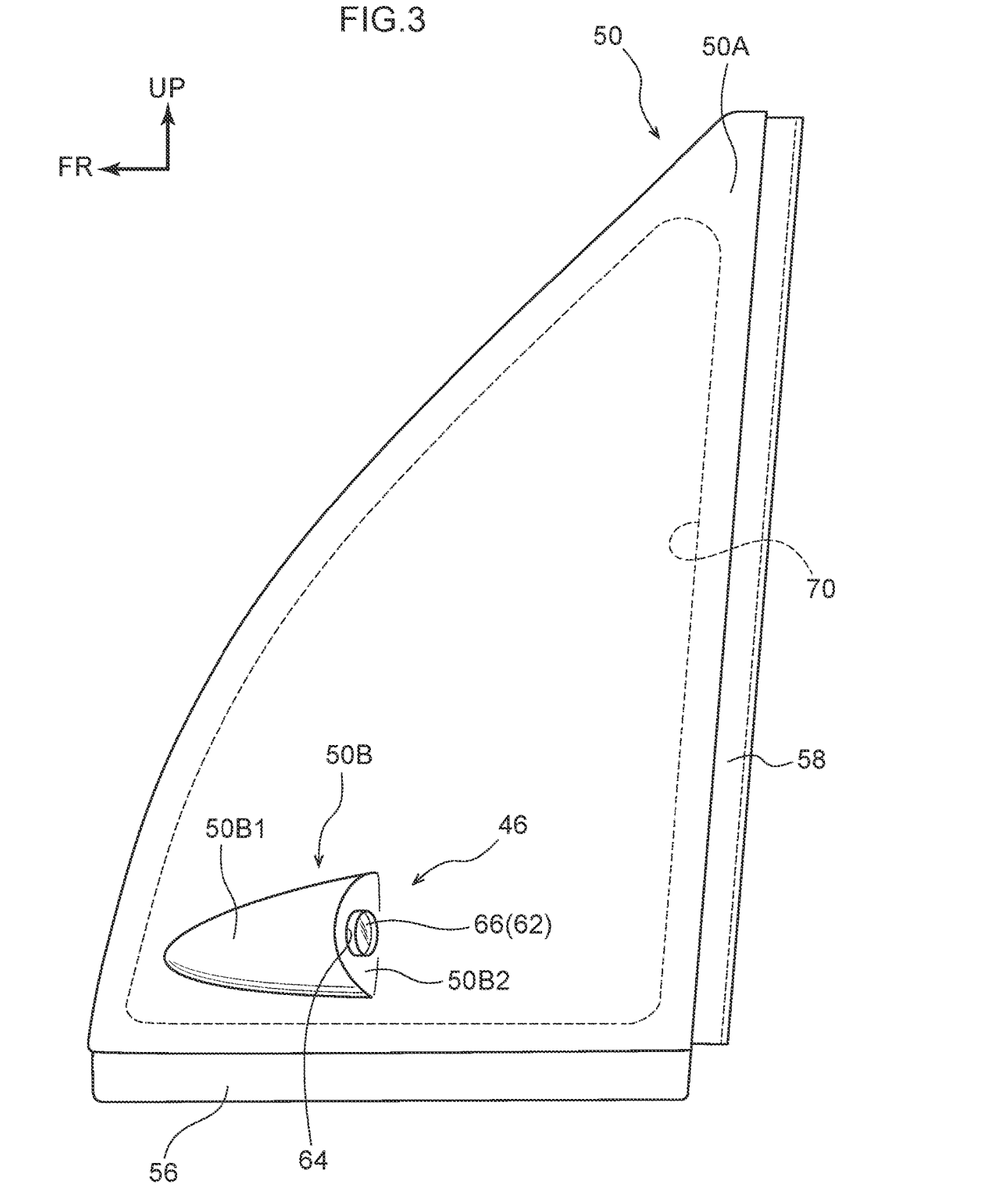
FIG. 3 is a side view that shows the structure of the vehicle rear viewing device relating to the first embodiment, and in which the vehicle rear viewing device being mounted to the vehicle is seen from the vehicle transverse direction outer side.

The housing 44 is disposed at the vehicle front side of the side door glass 34 and at the vehicle lower side of the pillar upper 24A of the front pillar 24. As shown in FIG. 2 and FIG. 3 as well, the housing 44 is formed in a box shape that is triangular and whose width widens toward the vehicle rear side as seen from the door thickness direction. Note that what is called "triangular" here and what is called "triangular" hereinafter encompasses not only exact triangular shapes, but also shapes that are substantially triangular.

Specifically, the housing 44 is structured to include an outer side portion 50 that is plate-shaped and structures the side surface at the vehicle transverse direction outer side of the housing 44, and an inner side portion 52 that is plate-shaped and structures the side surface at the vehicle transverse direction inner side of the housing 44. Note that the outer side portion 50 and the inner side portion 52 are disposed with a predetermined interval therebetween in the door thickness direction. The outer side portion 50 and the inner side portion 52 are connected by a peripheral wall portion 54 that structures the peripheral wall of the housing 44.

A pair of extending portions 56, which extend toward the vehicle lower side from the peripheral wall portion 54, are provided at the vehicle lower side portion of the peripheral wall portion 54. The extending portions 56 are structured in plate shapes that extend in the door transverse direction and whose thickness direction is the door thickness direction. The housing 44 is fixed to the side door 16 by the extending portions 56 being mounted to the side door main body 30 by unillustrated mounting members in a state in which the extending portions 56 are inserted into insert-through portions that are provided at the peripheral edge portion 30A of the side door main body 30. The shape of the peripheral edge portion at the vehicle front side of the housing 44 corresponds to the shape of the door frame 32. In the state in which the housing 44 is mounted to the side door 16, the housing 44 is disposed in a state in which this peripheral edge portion runs along the door frame 32.

An outer anchor portion 58 and an inner anchor portion 60 are provided at the vehicle rear side portion of the peripheral wall portion 54. The outer anchor portion 58 extends toward the vehicle rear side from the peripheral wall portion 54, and the distal end side thereof is bent toward the vehicle transverse direction inner side. The inner anchor portion 60 extends toward the vehicle rear side from the peripheral wall portion 54, and is disposed a predetermined interval apart from the outer anchor portion 58 in the door thickness direction. The vehicle front side portion of a glass run channel 62 that is disposed along the window frame 40 is anchored on the outer anchor portion 58 and the inner anchor portion 60.

Here, in the first embodiment, the components of the camera 46 and the components of the monitor 48 are housed inside the housing 44. The outer side portion 50 of the housing 44 configures a portion of the case of the camera 46. The inner side portion 52 of the housing 44 configures a portion of the case of the monitor 48.

Specifically, the outer side portion 50 includes a general portion 50A that structures the main portion of the outer side portion 50 and extends uniformly with the plate thickness direction thereof being the door thickness direction, and a camera case portion 50B that is formed at a vehicle front and lower side portion of the outer side portion 50 and bulges-out toward the vehicle transverse direction outer side from the general portion 50A. The camera case portion 50B includes a main body 50B1 that is dome-shaped and structures the main portion of the camera case portion 50B, and a rear wall portion 50B2 that closes-off the main body 50B1 from the vehicle rear side. A lens barrel 62 and unillustrated imaging elements and the like that structure the camera 46 are disposed inside the camera case portion 50B. Further, an outer side through portion 64 is formed at the central portion of the rear wall portion 50B2, and a lens portion 66 that is disposed at the distal end side of the lens barrel 62 is in a state of being exposed from the outer side through portion 64, and the rear side of the vehicle can be imaged by the camera 46. Note that the camera 46 that is structured as described above is disposed at the side portion of the vehicle 12 as seen in a broad perspective.

As shown in FIG. 4 as well, the inner side portion 52 includes a general portion 52A that structures the peripheral edge portion of the inner side portion 52 and extends uniformly with the plate thickness direction thereof being the door thickness direction, and a monitor case portion 52B that is positioned at the inner side of the general portion 52A as seen from the vehicle transverse direction inner side. As seen from the vehicle transverse direction inner side, the monitor case portion 52B is formed in a triangular shape whose peripheral edge portion runs along the general portion 52A, and the monitor case portion 52B bulges-out toward the vehicle transverse direction inner side from the general portion 52A. A liquid crystal panel 68 that serves as a display screen and structures the monitor 48, and an unillustrated backlight, and the like, are disposed inside the monitor case portion 52B.

Further, an inner side through portion 70 is formed at the monitor case portion 52B. The liquid crystal panel 68 is exposed from this inner side through portion 70 in a state of facing the vehicle transverse direction inner side (i.e., the driver's seat side). The inner side through portion 70 is formed in a triangular shape whose peripheral edge portion runs along the peripheral edge portion of the monitor case portion 52B (i.e., the inner side portion 52). A free form display, at which the shape of the liquid crystal panel 68 may be set freely, is employed at the monitor 48. The shape of the liquid crystal panel 68 is a triangular shape whose peripheral edge portion runs along the peripheral edge portion of the inner side through portion 70.

The liquid crystal panel 68 is disposed at the inner side of the cabin 18, and, more specifically, is disposed at the vehicle upper side of a dashboard 74 and at the vehicle lower side of a pillar garnish 72 that covers the front pillar 24 from the vehicle transverse direction inner side, as seen from the driver's seat side.

The monitor 48 structured as described above is electrically connected to the camera 46, and is capable of displaying, on the liquid crystal panel 68, the images captured by the camera 46. Electric power from an unillustrated power source that is installed in the vehicle 12 is supplied to the monitor 48 and the camera 46.

In the first embodiment, the housing 44 is structured by members at the outer side portion 50 side and members at the inner side portion 52 side being assembled together. The components of the camera 46 are mounted to members at the outer side portion 50 side, and the components of the monitor 48 are mounted to members at the inner side portion 52 side. However, embodiments are not limited to this. For example, the housing 44 may be structured such that members, which include the outer side portion 50 and the inner side portion 52, and members that structure portions of the peripheral wall portion 54 are assembled together. The arrangement of the parts of the camera 46 and the parts of the monitor 48 may be changed appropriately in accordance with the shape of the housing 44 or the like. Further, in the first embodiment, the vehicle rear viewing device 10 is disposed not only at the vehicle transverse direction left side, but also, a structure that has left-right symmetry with respect to the above-described structure is disposed at the vehicle transverse direction right side as well. Therefore, even if the vehicle 12 is a left-hand drive vehicle, the arrangement of the vehicle rear viewing device 10 is similar.

Operation and Effects of the First Embodiment

Operation and effects of the first embodiment are described next.

In the first embodiment, as shown in FIG. 1, the camera 46 that is capable of imaging the vehicle rear side is disposed at a side portion of the vehicle 12, and the images captured by the camera 46 are displayed on the liquid crystal panel 68, which faces the vehicle transverse direction inner side, of the monitor 48. Therefore, the driver is able to confirm the situation at the rear of the vehicle by viewing images displayed on the liquid crystal panel 68 of the monitor 48, instead of by viewing a door mirror.

In making compact an entire device that is used in confirming the rear of the vehicle, it has been thought to dispose a housing at the vehicle body 14 or at the side door 16, and to contain the camera and the monitor at the inner side of this housing. However, when the camera and the monitor are mounted separately to the inner side of the housing, the number of assembly processes of the device on the whole, which includes these parts, increases.

In the first embodiment, in the state in which the window opening 42 is closed by the side door glass 34, the housing 44 is disposed at the vehicle front side of the side door glass 34 and at the vehicle lower side of the pillar upper 24A of the front pillar 24. Further, the cases of the camera 46 and the monitor 48 are structured by the housing 44.

Namely, the housing 44 includes the outer side portion 50 that structures the side surface at the vehicle transverse direction outer side, and the inner side portion 52 that structures the side surface at the vehicle transverse direction inner side. Further, the camera case portion 50B of the outer side portion 50 structures a portion of the case of the camera 46, and the outer side through portion 64, through which the lens portion 66 of the camera 46 is exposed, is formed in this camera case portion 50B. Therefore, in the first embodiment, the outer side portion 50 of the housing 44 and the camera 46 are structured integrally.

Further, the monitor case portion 52B of the inner side portion 52 structures a portion of the case of the monitor 48, and the inner side through portion 70, through which the liquid crystal panel 68 of the monitor 48 is exposed in a state of facing the vehicle transverse direction inner side, is formed in the monitor case portion 52B. Therefore, in the first embodiment, the inner side portion 52 of the housing 44 and the monitor 48 are structured integrally.

As a result, in the first embodiment, the camera 46, the monitor 48 and the housing 44 are made integral, and are made into a module having an imaging function and an image display function. By mounting this module to the vehicle 12, the mounting of the camera 46 and the monitor 48 to the vehicle 12 is completed. Moreover, because the position at which the housing 44 is disposed is set as described above, the driver is able to view the liquid crystal panel 68 of the monitor 48 with a feeling that is similar to that at the time of viewing a door mirror at a vehicle to which a door mirror is mounted. Accordingly, in the vehicle rear viewing device 10 relating to the first embodiment, the number of assembly processes of the device on the whole may be reduced, and further, the driver may easily view the liquid crystal panel 68 of the monitor 48.

Further, in the first embodiment, the housing 44 is formed in a triangle shape whose width widens toward the vehicle rear side, as seen from the door thickness direction. Therefore, in a vehicle having a triangular window, the housing 44 is able to be disposed in place of the glass portion of this triangular window. Namely, changes in design that are needed when installing the vehicle rear viewing device 10 in a vehicle having a triangular window may be reduced. Further, the inner side through portion 70 is formed in a triangle shape whose peripheral edge portion runs along the peripheral edge portion of the inner side portion 52, and the liquid crystal panel 68 is formed in a triangle shape whose peripheral edge portion runs along the peripheral edge portion of the inner side through portion 70. Therefore, the liquid crystal panel 68 is able to be made large as compared with a case in which the liquid crystal panel is made in a rectangular shape that is contained within the inner side portion 52 as seen from the vehicle inner side, or the like. As a result, in accordance with the vehicle rear viewing device 10 relating to the first embodiment, universal usage in vehicles having a triangular window is ensured, and it is easy for the driver to view the liquid crystal panel 68 of the monitor 48.

Second Embodiment

Figure 5:
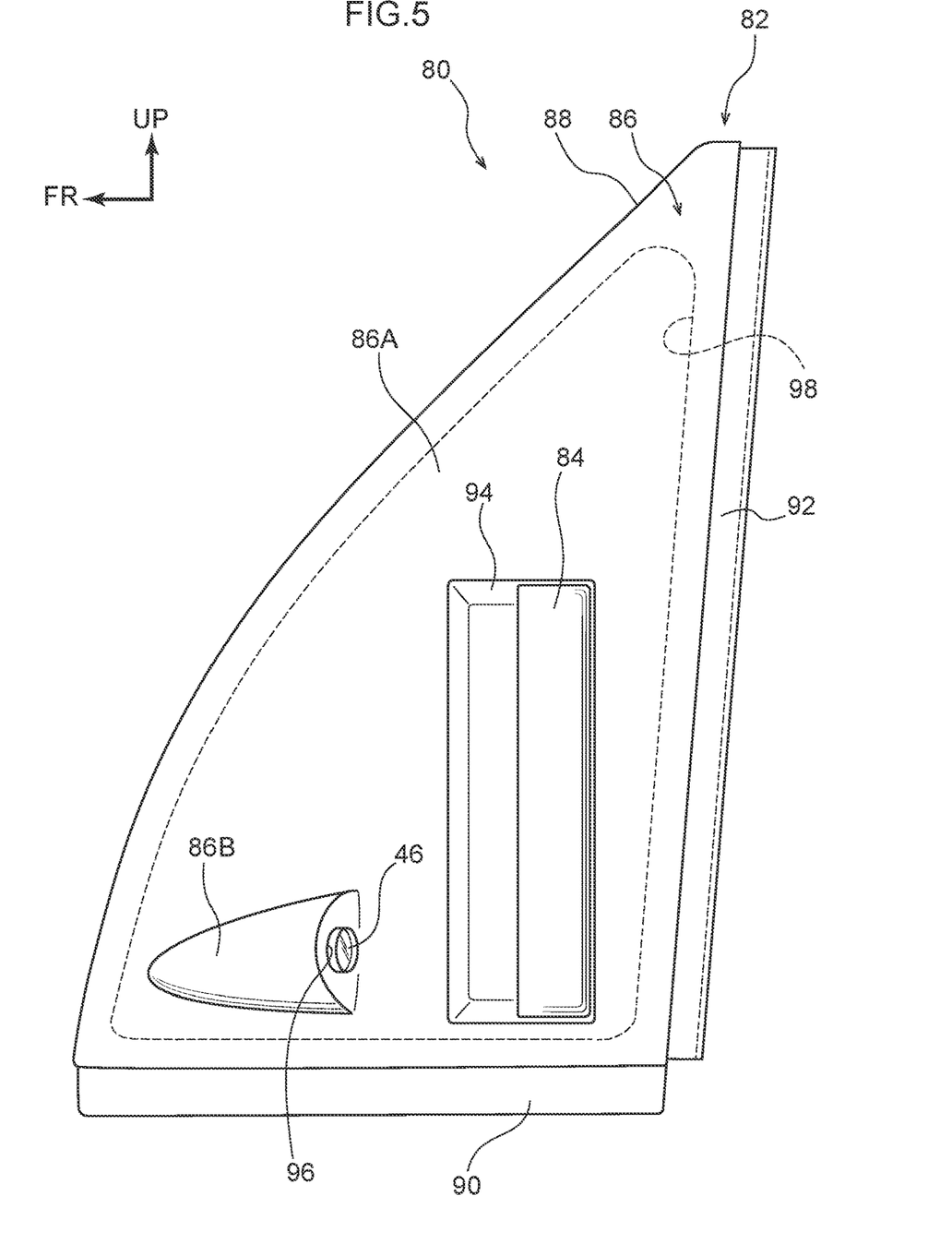
FIG. 5 is a side view that shows the structure of a vehicle rear viewing device relating to a second embodiment, and in which the vehicle rear viewing device being mounted to the vehicle is seen from the vehicle transverse direction outer side.

A second embodiment of a vehicle rear viewing device relating to the present disclosure is described hereinafter using FIG. 5. Note that components that are similar to those of the first embodiment are denoted by the same reference numerals, and description thereof is omitted.

A vehicle rear viewing device 80 relating to the second embodiment has the features that the side door 16 is a sliding door, and that a flap-type door handle 84 that is operated in order to open and close the side door 16 is mounted to a housing 82. Note that the side door 16 is not illustrated in FIG. 5 in order to make it easy to understand the structure of the housing 82.

In further detail, the housing 82 includes an outer side portion 86, an unillustrated inner side portion, a peripheral wall portion 88, a pair of extending portions 90, an outer anchor portion 92 and an unillustrated inner anchor portion, and is basically structured similarly to the above-described housing 44. However, the housing 82 differs from the housing 44 with regard to the point that an outer concave portion 94 is formed in the outer side portion 86. The outer side portion 86 includes a general portion 86A that is structured similarly to the general portion 50A, and a camera case portion 86B that is structured similarly to the camera case portion 50B and in which an outer side through portion 96 is formed. An inner side through portion 98, which is structured similarly to the inner side through portion 70 formed at the housing 44, is formed at the inner side portion of the housing 82.

The outer concave portion 94 is a rectangular shape whose length direction is the vehicle vertical direction as seen from the door thickness direction, and is a shape that is recessed toward the inner side portion as seen from the door width direction. Further, the door handle 84 is mounted to the vehicle rear side portion of the outer concave portion 94 in a state in which the door handle 84 is accommodated inside the outer concave portion 94 as seen from the door thickness direction. Although not illustrated directly, even when viewed from the door width direction, the door handle 84 is accommodated inside the outer concave portion 94, and the surface at the vehicle transverse direction outer side of the door handle 84 is positioned further toward the vehicle transverse direction inner side than the surface at the vehicle transverse direction outer side of the outer side portion 50.

In accordance with such a structure, the following operation and effects may be exhibited in addition to operation and effects that are similar to those of the first embodiment.

Namely, in the second embodiment, at a vehicle that is equipped with the sliding-type side door 16, the housing 82 is mounted to the side door 16. The door handle 84 that is operated in order to open and close the side door 16 is mounted to the outer side portion 86 of the housing 82. Therefore, in the second embodiment, the camera 46, the monitor 48, the door handle 84 and the housing 82 are made integral, and these parts are mounted to the vehicle 12 as a single module. Accordingly, the vehicle rear viewing device 80 relating to the second embodiment may contribute to a decrease in the number of assembly processes of the vehicle 12 that is equipped with the sliding-type side door 16.

Further, in the second embodiment, the outer concave portion 94, which is recessed toward the inner side portion of the housing 82, is formed at the outer side portion 86 of the housing 82, and the door handle 84 is accommodated inside this outer concave portion 94. Therefore, in the second embodiment, the door handle 84 appearing in the images that are captured by the camera 46 may be suppressed. Accordingly, in the vehicle rear viewing device 80 relating to the second embodiment, it is easier for the driver to confirm the situation at the rear of the vehicle at the vehicle 12 that has the sliding-type side door 16.

Supplementary Description of Embodiments (1) The above-described embodiments are structured such that the vehicle front side portion of the glass run channel 62 is mounted to the housing 44, 82, but embodiments are not limited to this. For example, there may be a structure in which a division bar that extends-out toward the vehicle upper side from the side door main body 30 is provided, and the vehicle front side portion of the glass run channel 62 is mounted to this division bar. In accordance with such a structure, anchor portions for mounting the glass run channel 62 are rendered unnecessary, and the structure of the housing 44, 82 may be simplified. When employing such a structure, configuration may be made such that the housing 44, 82 is fit together with a frame portion that is structured by the peripheral edge portion 30A of the side door main body 30, the door frame 32, and the division bar.

(2) Further, although the first embodiment is structured such that the housing 44 is mounted to the side door 16, embodiments are not limited to this. For example, there may be a structure in which, in accordance with the structure of the vehicle 12, an opening that is triangular as seen from the vehicle transverse direction is provided at the front pillar 24 at a position that is at the vehicle lower side of the pillar upper 24A, and the housing 44 is disposed in this opening.

(3) Moreover, in the second embodiment, the vehicle rear viewing device 80 that has the door handle 84 is mounted to the sliding-type side door 16, but embodiments are not limited to this. Namely, there may be a structure in which, in accordance with the structure of the vehicle 12, the vehicle rear viewing device 10 relating to the first embodiment is mounted to the sliding-type side door 16. Further, there may be a structure in which, in accordance with the structure of the vehicle 12, the entire door handle 84 is exposed at the vehicle transverse direction outer side, without providing the outer concave portion 94 at the housing 82. In the case of employing such a structure, the door handle 84 appearing in images captured by the camera 46 may be suppressed by making the amount by which the camera case portion 50B juts-out be large, and by placing the outer side through portion 64 at further toward the vehicle transverse direction outer side than its original position. Moreover, in a case in which a structure is employed in which the side door 16 is pivotably supported at the center pillar 26 via hinge portions provided at the vehicle rear side of the side door 16, there may be a structure in which the vehicle rear viewing device 80 that has the door handle 38 instead of the door handle 84 is disposed at the side door 16.

(4) In addition, although the above-described embodiments are structured such that the housing 44, 82 is triangular as seen from the door thickness direction, the shape of the housing 44, 82 may be changed appropriately in accordance with the structure of the side door 16 or the vehicle body 14. The shape of the liquid crystal panel 68 as well may be changed appropriately in accordance with the structure of the housing 44, 82, or the like. Moreover, a liquid crystal display other than a free form display may be employed at the monitor 48 in accordance with the structure of the housing 44, 82 or the like.

What is claimed is:

1. A vehicle rear viewing device comprising:
an imaging device that is disposed at a side portion of a vehicle and is configured to capture images toward a vehicle rear side;
a display device including a display screen that is configured to display the images captured by the imaging device; and
a housing that is mounted to a side door of the vehicle and that, in a state in which a vehicle upper side portion of a side door opening of a vehicle body that is opened and closed by the side door is closed by a side door glass, is configured to be disposed at a vehicle front side of the side door glass and at a vehicle lower side of a front pillar that structures a portion of the vehicle body, the housing including an outer side portion that structures a first side surface at a vehicle transverse direction outer side, and an inner side portion that structures a second side surface at a vehicle transverse direction inner side,
wherein the outer side portion structures a portion of a case of the imaging device, and includes an outer side through portion, through which a lens portion of the imaging device is exposed,
the inner side portion structures a portion of a case of the display device, and includes an inner side through portion, through which the display screen is exposed in a state of facing a vehicle transverse direction inner side,
the side door is a sliding-type door, and
a door handle for opening and closing the side door is mounted to the outer side portion.

2. The vehicle rear viewing device of claim 1, wherein
the housing has a substantially triangle shape whose width widens toward the vehicle rear side as seen from a thickness direction of the side door that is in a state of closing the side door opening,
the inner side through portion has a substantially triangle shape whose peripheral edge portion runs along a peripheral edge portion of the inner side portion, and
the display screen has a substantially triangle shape whose peripheral edge portion runs along the peripheral edge portion of the inner side through portion.

3. The vehicle rear viewing device of claim 1, wherein
the outer side portion includes an outer concave portion that is recessed toward the inner side portion, and
the door handle is accommodated inside the outer concave portion.

* * * * *